United States Patent
Chiatti et al.

(10) Patent No.: US 12,196,665 B2
(45) Date of Patent: Jan. 14, 2025

(54) OPTICAL CHAMBER FOR SMOKE DETECTION WITH REFLECTIVE SURFACES

(71) Applicant: Honeywell International Inc., Charlotte, NC (US)

(72) Inventors: Andrea Chiatti, Trieste (IT); Andrea Frison, Monfalcone (IT); Massimo Bressanutti, Sesto al Reghena (IT); Maurizio Berliavaz, Trieste (IT)

(73) Assignee: Honeywell International Inc., Charlotte, NC (US)

( * ) Notice: Subject to any disclaimer, the term of this patent is extended or adjusted under 35 U.S.C. 154(b) by 188 days.

(21) Appl. No.: 17/530,075

(22) Filed: Nov. 18, 2021

(65) Prior Publication Data

US 2023/0152204 A1    May 18, 2023

(51) Int. Cl.
  *G01N 15/1434*    (2024.01)
  *G08B 17/107*    (2006.01)
(52) U.S. Cl.
  CPC ....... *G01N 15/1434* (2013.01); *G08B 17/107* (2013.01)
(58) Field of Classification Search
  None
  See application file for complete search history.

(56) References Cited

U.S. PATENT DOCUMENTS

| | | | |
|---|---|---|---|
| 2006/0261967 A1* | 11/2006 | Marman | G08B 17/103 340/630 |
| 2018/0061215 A1* | 3/2018 | Vollenweider | G08B 17/117 |
| 2021/0123863 A1 | 4/2021 | Gadonniex et al. | |
| 2021/0295667 A1* | 9/2021 | Zu | G08B 17/113 |

FOREIGN PATENT DOCUMENTS

| | | |
|---|---|---|
| CN | 106056830 | 10/2016 |
| CN | 112712666 A | 4/2021 |

OTHER PUBLICATIONS

KR 20150002299 A (Year: 2015).*
Cleary, et al., "Multi-angle Multi-wavelength Light Scattering of Smokes and Cooking Aerosols"; Suppression, Detection and Signaling Research and Applications Symposium (SupDET 2016) Mar. 1-4, 2016 (26 pgs).

* cited by examiner

*Primary Examiner* — Rufus L Phillips
(74) *Attorney, Agent, or Firm* — Brooks, Cameron & Huebsch, PLLC

(57) ABSTRACT

Devices, systems, and methods for providing smoke detectors are described herein. One smoke detector of a fire sensing system includes a circuit board body, having a set of front scattering emitting light sources located on one side of an optical chamber, a receiver of front scattering light beams from the front scattering emitting light sources and backward scattering light beams, and a set of backward scattering emitting light sources located between the set of front scattering emitting light sources and the receiver, the backward scattering light beams emitted from the backward scattering emitters.

15 Claims, 8 Drawing Sheets

OPTICAL CHAMBER FOR SMOKE DETECTION WITH REFLECTIVE SURFACES

TECHNICAL FIELD

The present disclosure relates to devices, systems, and methods for providing an optical chamber for smoke detection with reflective surfaces.

BACKGROUND

Facilities (e.g., buildings), such as commercial facilities, office buildings, hospitals, and the like, may have a fire detection system that can be triggered during an emergency situation (e.g., a fire) to warn occupants to evacuate. For example, a fire detection system may include a fire alarm control panel within the building and a plurality of smoke detectors located throughout the facility (e.g., on different floors and/or in different rooms of the facility) that can sense a smoke condition indicative of a fire occurring in the facility and provide a notification of the smoke condition to the occupants of the facility and/or building monitoring personnel via alarms or other mechanisms.

Such detectors can use preconfigured optical blocks that include, in the case of detection of a single forward scattering signal, only:

an emitter;
a receiver; and
one or more plastic parts for holding and alignment of optic components.
Various types of such optical configurations are utilized presently.

These optical blocks are integrated into a system that also includes a printed circuit board (PCB) for the electrical connection of optical emitters and receivers and other mechanical parts (e.g., plastic covers with wings) that direct the smoke particulate toward the detection zone and complete the configuration of the sensing chamber used to sense a fire condition.

In one prior implementation, the emitters and receivers are carried by a plastic optical block that provides a fixed orientation and barriers therebetween. The optical block with the emitter and the receiver and a metal shield constitutes a surface mounted device (SMD) that, through a plurality of pick-and-place areas, can be placed on the printed circuit board with an automatic assembly process. The optical block surface mounted device configuration is an advantage with respect to the manual soldering of optical emitters and receivers, but the optical block is a custom surface mounted device component that has low scalability (for example, it is very difficult to integrate a further detection based, for example, on backward scattering by adding other surface mounted device components) and its pick-and-place process is complex and susceptible to generating rejected pieces.

In another prior art configuration, two prisms (one for light emission and one for light reception), often made of a transparent resin material, are disposed in a guide hole in the light-emission axis direction: the two prisms accommodate, respectively, an emitter and a receiver. The two prisms have a total-reflection surface and a lens that causes light to be directed and condensed to and from the sensing zone.

This prior configuration has the advantage of permitting the use of standard and commercial surface mounted device emitters and receivers, mounted with standard Surface Mount Technology (SMT) on the printed circuit board; the functionality to direct and collect light to and from smoke particulate is assured by two prisms with total reflection surfaces and lenses. However, this optical system is substantially composed of different parts that include two prisms and a box-shaped main body with dedicated guide holes that cover them. This prior design offers the convenience of using commercial surface mounted device emitters and receivers but has a higher number of components (at least a dedicated main body and two prisms, in addition to the surface mounted device emitters and receivers) and, thereby, may not be as desirable.

DETAILED DESCRIPTION

Figure 1:
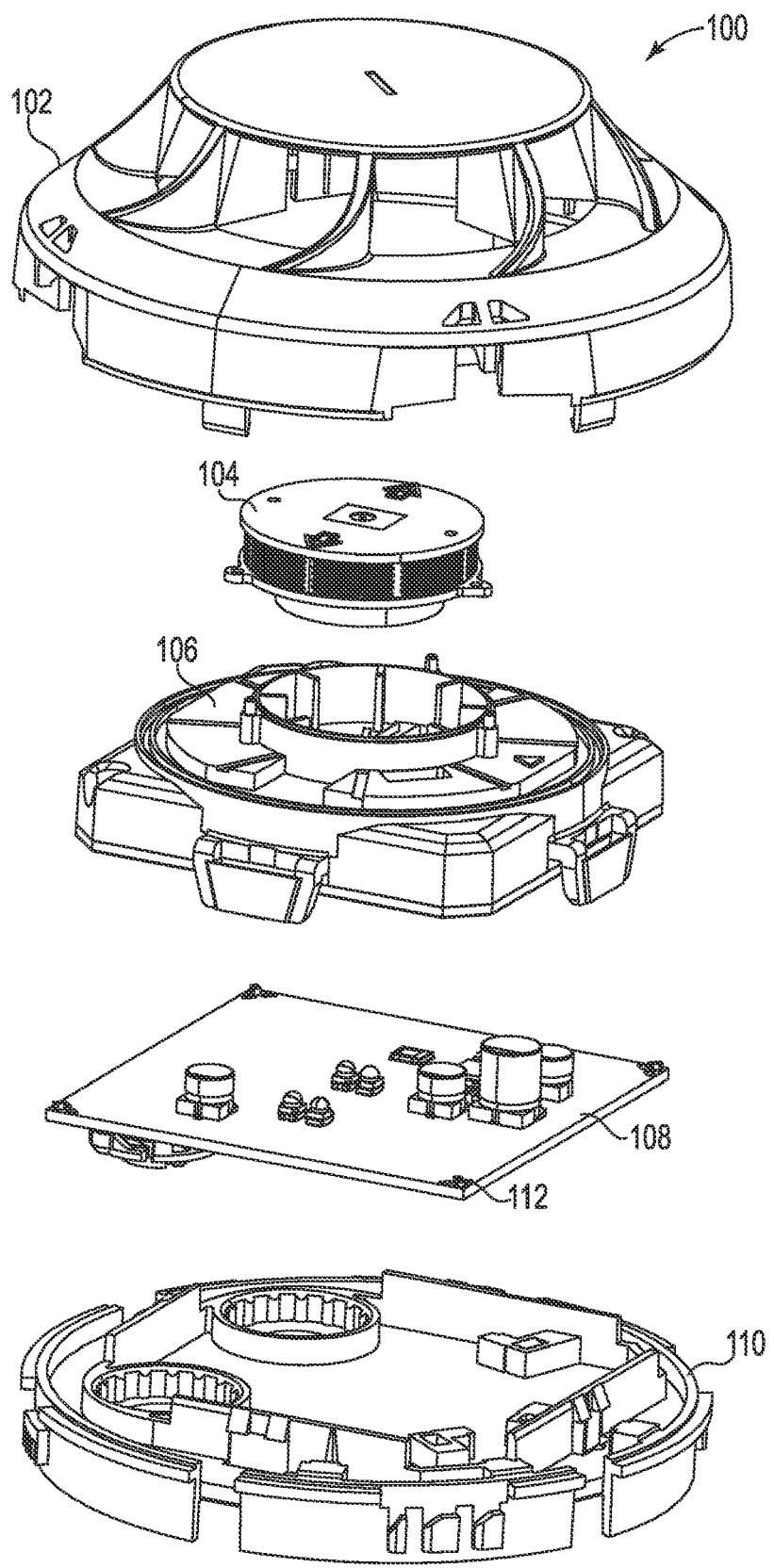
FIG. 1 is an exploded view of a smoke detector in accordance with one or more embodiments of the present disclosure.

Devices, systems, and methods for providing an optical chamber for smoke detection with reflective surfaces are described herein. The present disclosure pertains to optical smoke detectors or multi-criteria smoke detectors that use an optical system to detect light scattered by smoke particulate: these systems generally include a sensing chamber (where particulate enters), optical emitters, and receivers and electronic control circuits to operate the system.

The embodiments of the present disclosure are intended to overcome the above issues by providing a solution that integrates simplicity of the assembling process (e.g., SMT, minimization of the number of mechanical parts), scalability to dual angle/dual wavelength (2A/2W) optical detection, cost-effectiveness while maintaining good optical sensitivity, and/or high immunity to nuisance sources.

In this detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an exploded view of a smoke detector in accordance with one or more embodiments of the present disclosure. In the embodiment illustrated in FIG. 1, the smoke detector 100 includes a detector cover 102, an optical chamber cover 104, a circuit board cover 106, a circuit board 108 (shown here with surface mounted thermistors 112 provided at the corners of the circuit board), and a detector base 110. When assembled, the smoke detector is depicted in the cut-away view of FIG. 2.

The assembling process of smoke detectors with optical chambers having reflective surfaces can, for example, include different stages, such as the following:
1. SMT circuit board assembly;
2. Placement of the circuit board on the detector base;
3. Covering of the circuit board with the circuit board cover with reflective surfaces;
4. Placement of the chamber cover on the circuit board cover;
5. Mounting of the smoke detector cover;
6. Smoke detector microcontroller programming, calibration, and prepackage testing; and
7. Smoke detector packaging.

Figure 2:
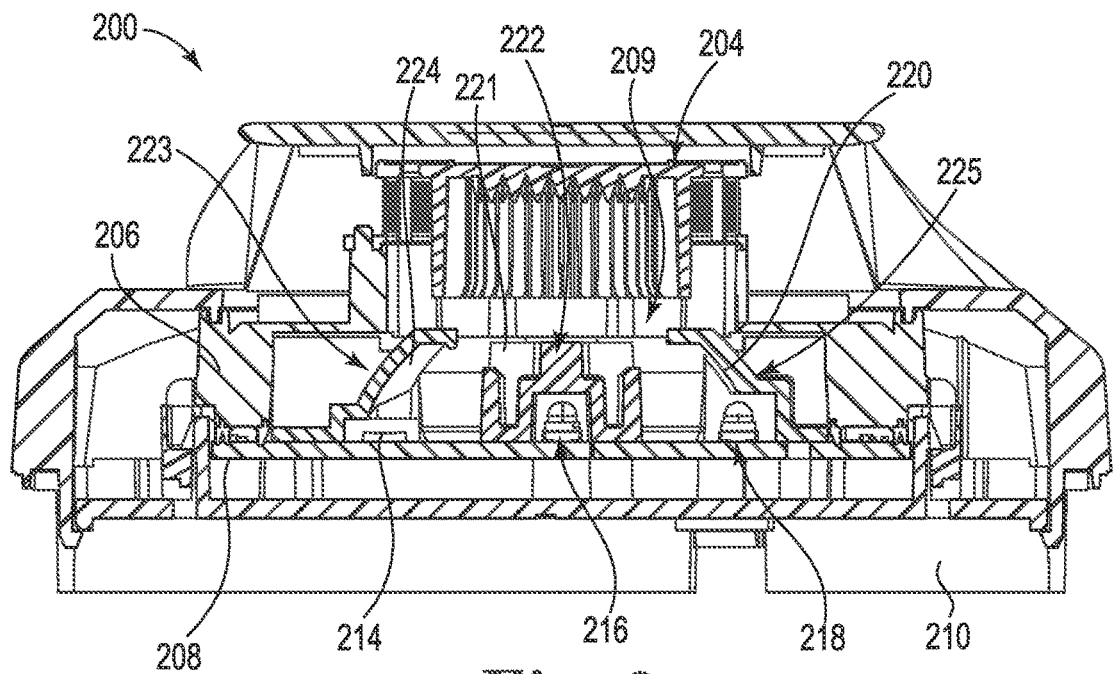
FIG. 2 is a cut-away view of the interior of a smoke detector in accordance with one or more embodiments of the present disclosure.

FIG. 2 is a cut-away view of the interior of a smoke detector in accordance with one or more embodiments of the present disclosure. As in FIG. 1, the smoke detector 200 shown in FIG. 2 includes detector cover 202, an optical chamber cover 204, a circuit board cover 206, a circuit board 208, and a detector base 210.

Also illustrated are an emitter mirror 220 with a set of forward scattering emitters 218 (e.g., surface mounted type emitters) positioned within an emitter mirror module 225 below the mirror 220 that is part of the module 225. Also provided are a set of backward scattering emitters 216 (e.g., surface mounted type emitters) that are positioned within a backward scattering cavity 222 formed within a backward scattering module 221. Additionally, a receiver 214 (e.g., surface mounted type receiver) is positioned below a receiver mirror 244 that is part of a receiver module 223.

The optical chamber for smoke detection with reflective surfaces, such as that illustrated in FIGS. 1 and 2 and the other embodiments as discussed herein can be integrated in many current photoelectric based smoke detector designs. In some embodiments, a unique optical chamber with reflective surfaces, as discussed herein, can be formed by three parts:
  a circuit board where, for example, surface mounted device components (e.g., four SMD emitters (two forward scattering and two backward scattering) and one SMD receiver) are mounted, for example, with standard SMT assembly processes (e.g., circuit board 108/208;
  a circuit board cover with reflective surfaces (e.g., lower part of the optical chamber, such as 106/206); and
  a chamber cover (e.g., upper part of the optical chamber, such as 104/204).

One example embodiment of the present disclosure includes a smoke detector of a fire sensing system, including a circuit board body, having a set of front scattering emitting light sources located on one side of an optical chamber, a receiver of front scattering light beams from the front scattering emitting light sources and backward scattering light beams, and a set of backward scattering emitting light sources located between the set of front scattering emitting light sources and the receiver, the backward scattering light beams emitted from the backward scattering emitters.

Figure 3:
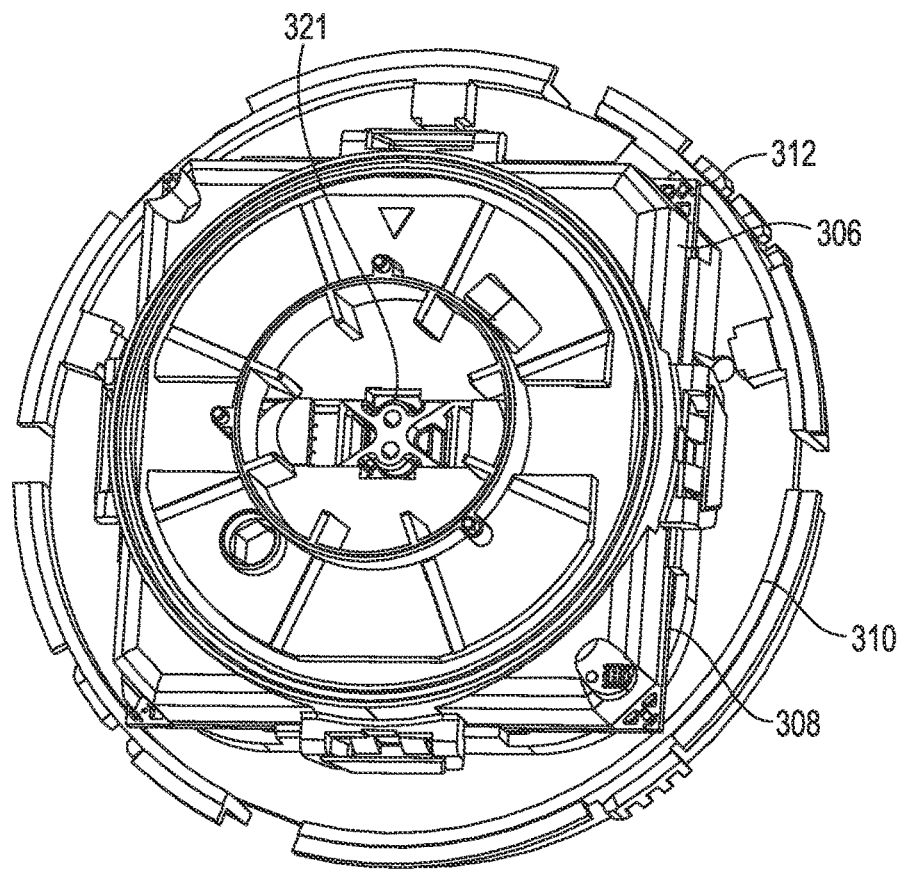
FIG. 3 is a top perspective view of a smoke detector of a fire alarm system with the detector cover and optical chamber cover removed constructed in accordance with one or more embodiments of the present disclosure.

FIG. 3 is a top perspective view of a smoke detector of a fire alarm system with the detector cover and optical chamber cover removed constructed in accordance with one or more embodiments of the present disclosure. FIG. 3 is provided so the reader can see the assembled structures (i.e., circuit board cover 306, circuit board 308 (shown here with surface mounted thermistors 312 provided at the corners of the circuit board), and detector base 310). From this view, some of the structure of the backward scattering module 321 can be seen. These features will be discussed in more detail below with respect to FIG. 7, but this figure provides relational context to the positioning of the backward scattering module 321.

Figure 4:
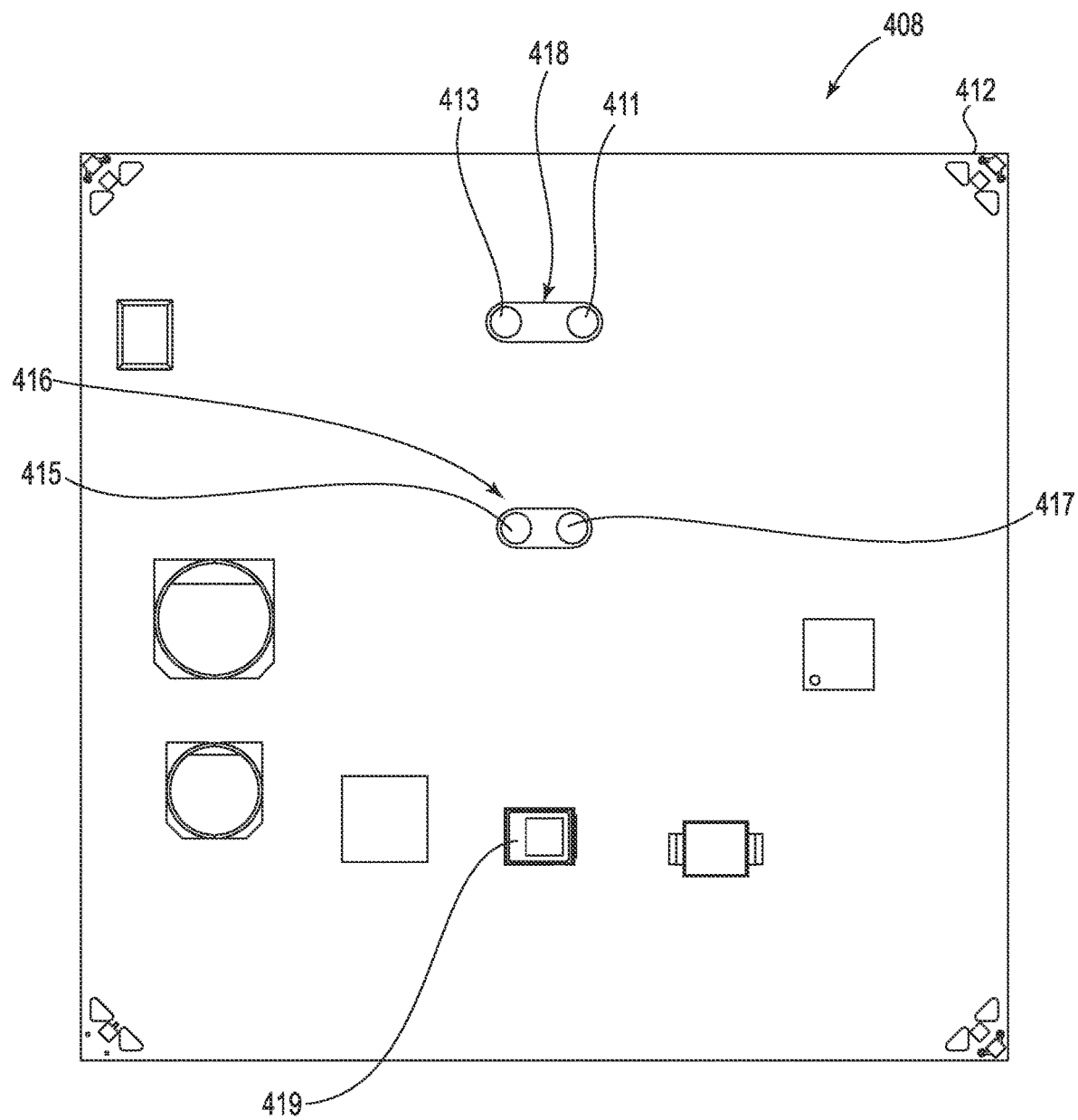
FIG. 4 is a front side of a circuit board of a smoke detector of a fire alarm system in accordance with one or more embodiments of the present disclosure.

FIG. 4 is a front side of a circuit board of a smoke detector of a fire alarm system in accordance with one or more embodiments of the present disclosure. Preferably, a printed circuit board integrates the emitters, the receiver, and all the electronic circuits necessary to drive the emitters and collect, analyze, and/or transmit the information from the receiver to a control panel of a fire system (located remotely from the detector device).

To implement a dual angle/dual wavelength configuration, a single receiver and four emitters (e.g., one infrared 411 and one blue 413 emitter for forward optical scattering, one infrared 417 and one blue 415 emitter for backward optical scattering) configuration can be utilized. Such an embodiment is illustrated in FIG. 4, where a printed circuit board 408 includes a set of forward scattering emitters 418

(411 and 413) and a set of backward scattering emitters 416 (417 and 415) and a receiver 419 provided thereon.

The electronic circuit pulses one emitter at a time and the radiation coming from this emitter, scattered by smoke, is collected by the receiver generating the related optical signal. During a cycle (e.g., of 4 seconds) all of the four emitters are pulsed in sequence (e.g., every second) generating at the receiver four different optical signals (e.g., Infrared Forward Scattering (IR FS), Blue Forward Scattering (Blue FS), Infrared Backward Scattering (IR BS), and Blue Backward Scattering (Blue BS)). As used herein, a suitable infrared wavelength emitter is in the range of between 700 nm to 1 mm and a suitable blue wavelength emitter is in the range of between 400 to 525 nm.

Smoke detectors are important components in some types of fire detection systems. Also, important are the controllers that provide the detection analysis, alarming functionality, and communication functions with other fire system devices. The printed circuit board 408, designed according to the embodiments of the present disclosure, can provide these functions in one unitary circuit board. The signals discussed above from the receiver can be stored in memory and/or analyzed by a controller on the printed circuit board or connected thereto to determine, for example, whether a fire condition exists near the detector.

The type of data obtained by the dedicated software in firmware in the controller and/or stored in memory can be volatile integer data representing an amount of particulate detected within the smoke detector optical chamber. Additionally, this data can be stored in random access memory (RAM) and used for fire alarm generation or, at application level, stored into a non-volatile RAM (NVRAM) for diagnostic purposes to evaluate the particulate density using different types of algorithms (e.g., average, mode, etc.). This layer can be provided, for example, at the fire system control panel.

Also illustrated in the implementation shown in FIG. 4, are surface mounted thermistors 412 provided on the corners, defined by the edge of the printed circuit board 408. In this manner, costs and manufacturing time and complexity can be reduced, among other benefits. This embodiment shows apertures formed near the corner. These apertures insulate the thermistor from the thermal inertia of the rest of the circuit board. This is important since the thermistor is detecting temperature and the circuit board is generating heat that may create false readings at the thermistor.

Any number of apertures can be provided. In FIG. 4, there are two apertures with a bridge between them that allows for circuitry to span the bridge and connect the thermistor to other circuitry of the circuit board.

Figure 5:
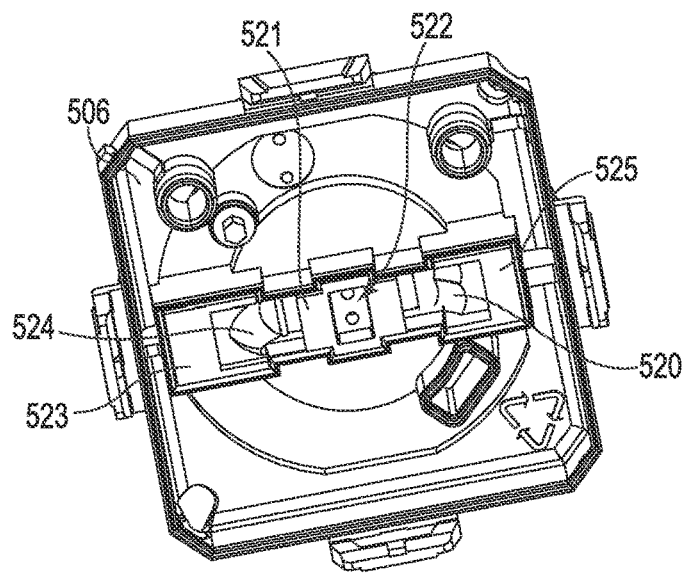
FIG. 5 is a bottom perspective view of a circuit board cover of a smoke detector of a fire alarm system constructed in accordance with one or more embodiments of the present disclosure.

FIG. 5 is a bottom perspective view of a circuit board cover of a smoke detector of a fire alarm system constructed in accordance with one or more embodiments of the present disclosure.

The circuit board cover 506 integrates, in a unique part, the optical parts useful to direct and focus the radiation from the four emitters and scattered by smoke. These optical parts are not prisms or lenses but reflective surfaces (520 and 524) of the circuit board cover 506 or one or more modules (modules 523, 521, and 525 in FIG. 5) installed therein, with an appropriate shape, size, and position to direct the light from a light source as desired.

The geometry of these reflective surfaces is unique to the embodiments of the present disclosure. The geometry of the emitter mirror structure includes a double tilted ellipsoidal mirror (emitter mirror) that collects the beams of light from two adjacent forward scattering emitters (e.g., 411, 413 of FIG. 4) and directs the light beams toward the receiver (e.g., 419), passing through a central zone of a smoke chamber. The emitter mirror 520 is composed of two portions of two ellipsoids, each of one tilted with respect to the optical axis (e.g., by ±5 degrees). This relationship is shown in more detail in FIG. 11. Further, an ellipsoidal receiver mirror 524 collects radiation scattered by smoke particles and directs it onto the device receiver (e.g., 419 of FIG. 4).

Figure 6:
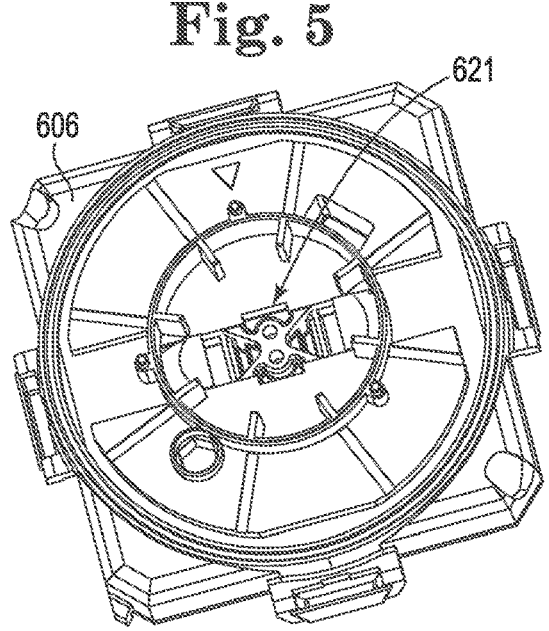
FIG. 6 is a top perspective view of a circuit board cover of a smoke detector of a fire alarm system constructed in accordance with one or more embodiments of the present disclosure.

FIG. 6 is a top perspective view of a circuit board cover of a smoke detector of a fire alarm system constructed in accordance with one or more embodiments of the present disclosure. As shown in FIGS. 5 and 6, a backward scattering (BS) cavity module 621 (521 in FIG. 5), separates the two forward scattering emitters and the receiver. This cavity provides several functions, including: avoiding direct illumination of the receiver and hosting the backward scattering emitters (e.g., one infrared and one blue). For these reasons, the backward scattering cavity has barriers to restrict the propagation of the light beams produced from the backward scattering emitters and holes from which the infrared and blue radiation beams of light emanate. These features can be seen in more detail in FIGS. 7 and 13.

In the embodiment of FIG. 6, the backward scattering cavity module 621 is positioned in the circuit board cover 606. The main body of the circuit board cover can be made entirely by highly reflective plastic material (e.g., polycarbonate (PC), metallized acrylonitrile butadiene styrene (ABS)). This can provide several benefits, such as: simplifying the manufacturing process (not having to mount parts, such as mirrors), reducing parts (no separately mounted mirrors), reduce costs, improve consistency of measurement (molded parts will be more consistent), and obtain good optical efficiency. However, in other embodiments, the body can be made by a plastic material with deposition of highly reflective metallic thereon (e.g., aluminum, chromium, etc.) to maximize optical efficiency.

The body of the circuit board cover can also be composed by different materials, using a multi-material molding process, in order to maximize reflectivity only on the surfaces that are used to direct light from emitters to the scattering zone and to focus light from the scattering zone to the receiver. In some implementations, other surfaces, not necessary to direct light or focus light, can be black or another suitable surface color/texture to absorb light and minimize unwanted reflections.

Figure 7:
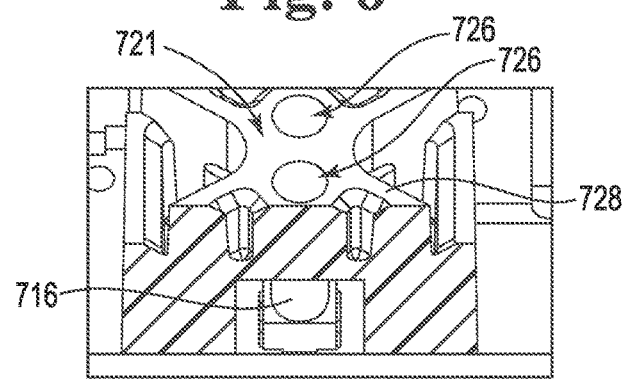
FIG. 7 is a close-up perspective view of the backward scattering module constructed in accordance with one or more embodiments of the present disclosure.

FIG. 7 is a close-up perspective view of the backward scattering module constructed in accordance with one or more embodiments of the present disclosure. In the embodiment illustrated in FIG. 7, the backward scattering module 721 forms a cavity therein that houses the backward scattering emitters 716. Also, as noted above, the module is structured to have barriers 728 (e.g., two "V" shaped barriers) and holes 726 (e.g., two holes) from which the infrared and blue radiation light beams emanate. These features control the direction in which the light beams created by the backward scattering emitters can travel in the detector.

Figure 8:
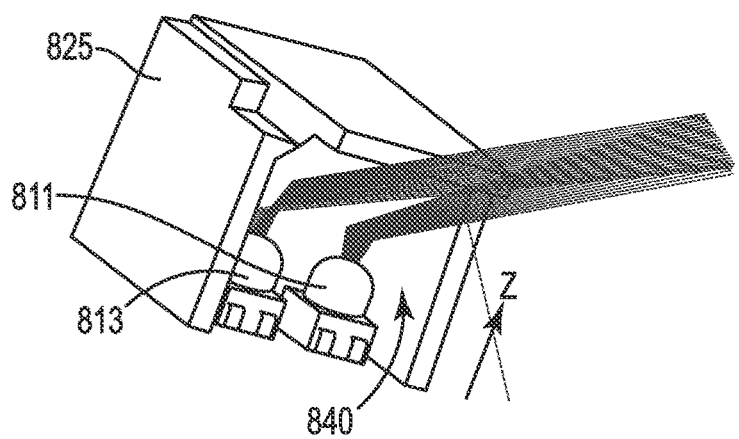
FIG. 8 is close-up front perspective view of the emitter unit constructed in accordance with one or more embodiments of the present disclosure.

FIG. 8 is close-up front perspective view of the emitter unit constructed in accordance with one or more embodiments of the present disclosure. The embodiment illustrated in FIG. 8 shows how a module 825 has a reflective housing that form a cavity 840 therein. The emitters 811 and 813 emit light beams into the cavity 840 and the inner surfaces of the housing of the module 825 direct the light in a predictable manner out into the optical cavity (central scattering zone) of the detector device. As can be inferred from this description, the shape of the reflective interior surfaces can be used to change the direction of the emitted light. For example, in order to integrate two emitters (e.g., IR and blue) forward scattering into the smoke chamber, a dual ellipsoidal mirror that directs light of both emitters in a central scattering zone can be utilized. For instance, each portion of the ellipsoid can be shifted and tilted 5 degrees with respect to the optical axis (e.g., optical axis 932 in FIG. 9).

Figure 9:
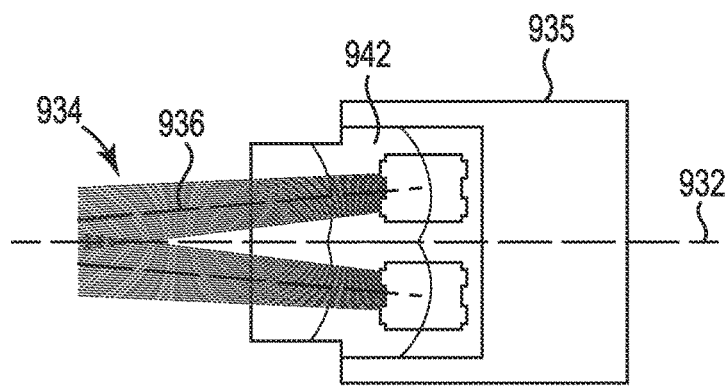
FIG. 9 is close-up bottom perspective view of the emitter unit constructed in accordance with one or more embodiments of the present disclosure.

FIG. 9 is close-up bottom perspective view of the emitter unit constructed in accordance with one or more embodiments of the present disclosure. FIG. 9 illustrates the module 925 having a housing with an ellipsoid inner surface 942 that acts to direct the light beams 934 in a direction 936 that is angled with respect to the optical axis 932. As discussed above, this angle can be changed based on changing the shape of the inner surface 942.

Since the surface is a unitary part of the module 925, the precision between detector devices can be more accurate than a design that places one or more mirrored surfaces to achieve the reflecting of the light beams. Additionally, if the parts are formed through a molding process, the surfaces between the same parts created by the molding process can be nearly identical which also increases predictability of detection.

Figure 10:
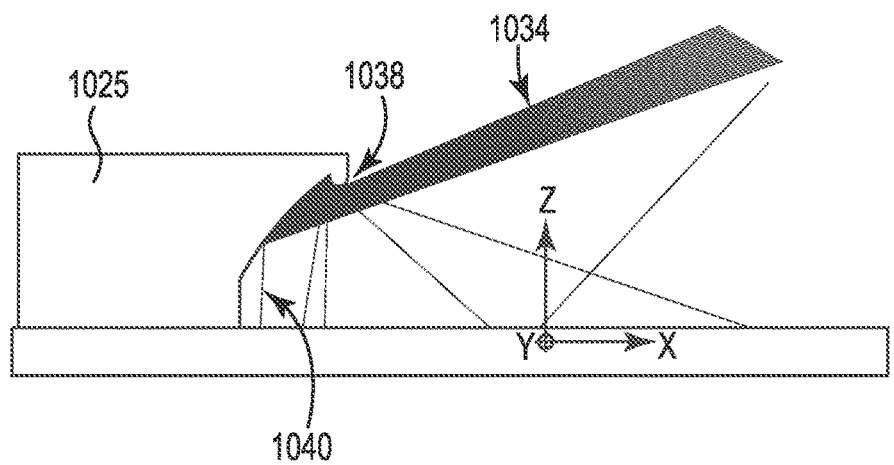
FIG. 10 is close-up side perspective view of the emitter unit constructed in accordance with one or more embodiments of the present disclosure.

FIG. 10 is close-up side perspective view of the emitter unit constructed in accordance with one or more embodiments of the present disclosure. FIG. 10 illustrates the module 1025 having a housing with a cavity 1040 formed therein as is also illustrated in FIGS. 8 and 9. In this illustration, the light beams are tilted at an angle 1038 (e.g., 30 degrees) upward from the X-axis based on the reflective inner surfaces of the housing. As discussed above, the inner surfaces can be designed differently to change the angle at which the light is tilted with respect to the X-axis. As illustrated, the angle of tile of the light beams can be somewhat scattered, but the beams can be configured to be within a threshold quantity of degrees from a desired angle of tilt (e.g., plus or minus 10 degrees from 30 degrees).

Figure 11:
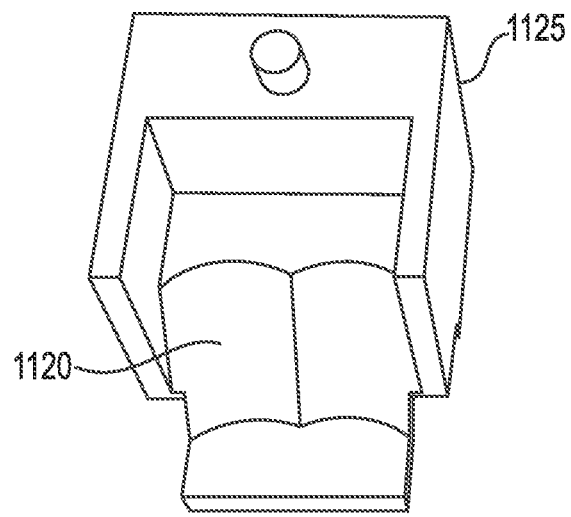
FIG. 11 is a close-up view upward from below the emitter module constructed in accordance with one or more embodiments of the present disclosure.

FIG. 11 is a close-up view upward from below the emitter module constructed in accordance with one or more embodiments of the present disclosure. In FIG. 11, a double emitter structure of the interior reflective surfaces 1120 of the emitter module 1125 housing can be seen. As illustrated, the overall surface 1120 has two major portions that are each designed to interact with a respective emitter (e.g., 811 and 813 of FIG. 8). In this manner, one module can be produced that can precisely direct light beams from multiple emitting light sources. Further, the modular design of these modules depicted in FIGS. 11, 12, and 13 can allow for precise positioning within the circuit board cover (e.g., 606 of FIG. 6) and thereby precise positioning within the detector, resulting in more accurate detection of smoke and more reliable fire detection.

Figure 12:
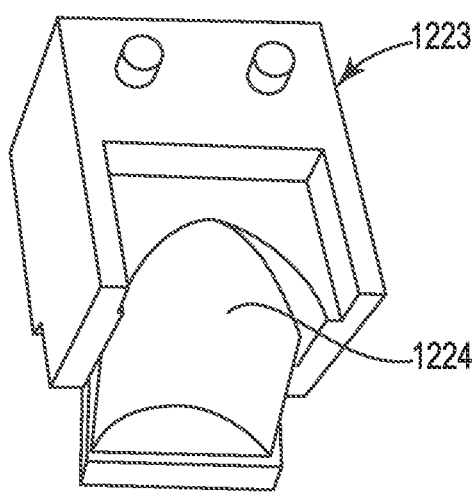
FIG. 12 is a close-up view upward from below the receiver module constructed in accordance with one or more embodiments of the present disclosure.
Figure 13:
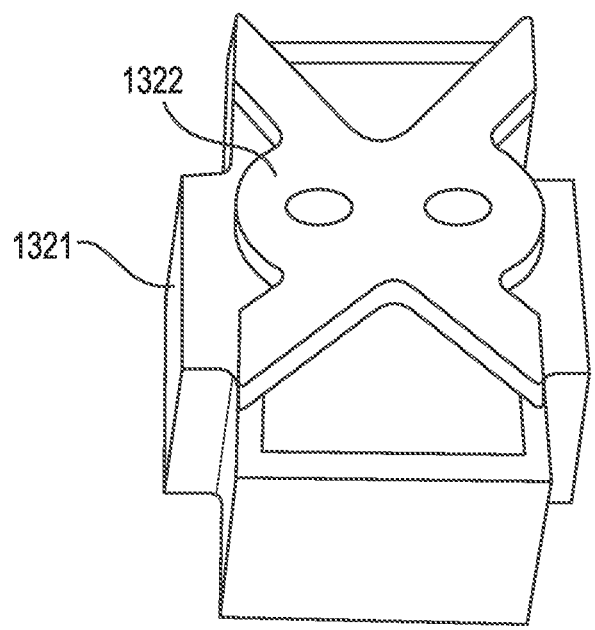
FIG. 13 is a close-up top perspective view of the optical cavity module constructed in accordance with one or more embodiments of the present disclosure.

For example, as can be seen in FIG. 5, a fixture within the circuit board cover structure can be shaped to precisely fit the shapes of the emitter, receiver, and optical cavity modules (523, 521, and 525 in FIGS. 5 and 1223, 1321, and 1125 in FIGS. 11, 12, and 13). In this way, the modules can be precisely positioned with respect to each other and to other components of the detector.

FIG. 12 is a close-up view upward from below the receiver module constructed in accordance with one or more embodiments of the present disclosure. In this illustration, the module 1223 has a housing interior surface 1224 that is shaped to direct received light beams entering the interior of the cavity within the housing to a receiver (e.g., 419 of FIG. 4). As discussed above, the interior surface can be shaped differently depending, for example, on the angles of the light beams being received and based on the location of the receiver with respect to the reflective interior surface.

FIG. 13 is a close-up top perspective view of the optical cavity module constructed in accordance with one or more embodiments of the present disclosure. This illustration shows the module 1321 with an optical cavity 1322 that houses the backward scattering emitters (e.g., emitters 415 and 417 of FIG. 4). As discussed above, the module can be shaped to fit in a specific position in the circuit board cover. For example, in the illustrated embodiment, the module 1321 has a plus shape (when viewed from the top). The circuit board cover in FIG. 5 (and modules 523 and 525 when positioned in the cover 506), has a corresponding shape wherein, when the plus shaped module is placed therein, it is precisely positioned in the cover and with respect to the emitters and receiver and their mirrored module surfaces.

In some embodiments, at least two of: the forward scattering emitter module, the backward scattering emitter module, and the receiver module are a unitary combined module. For example, as shown in FIG. 5, the units 521, 523, and 525 can be one unitary piece that can be positioned in circuit board cover 506, or alternatively, modules 523 and 521 or 525 and 521 can be unitary and can be positioned in cover 506 with the remaining module during assembly.

Figure 14:
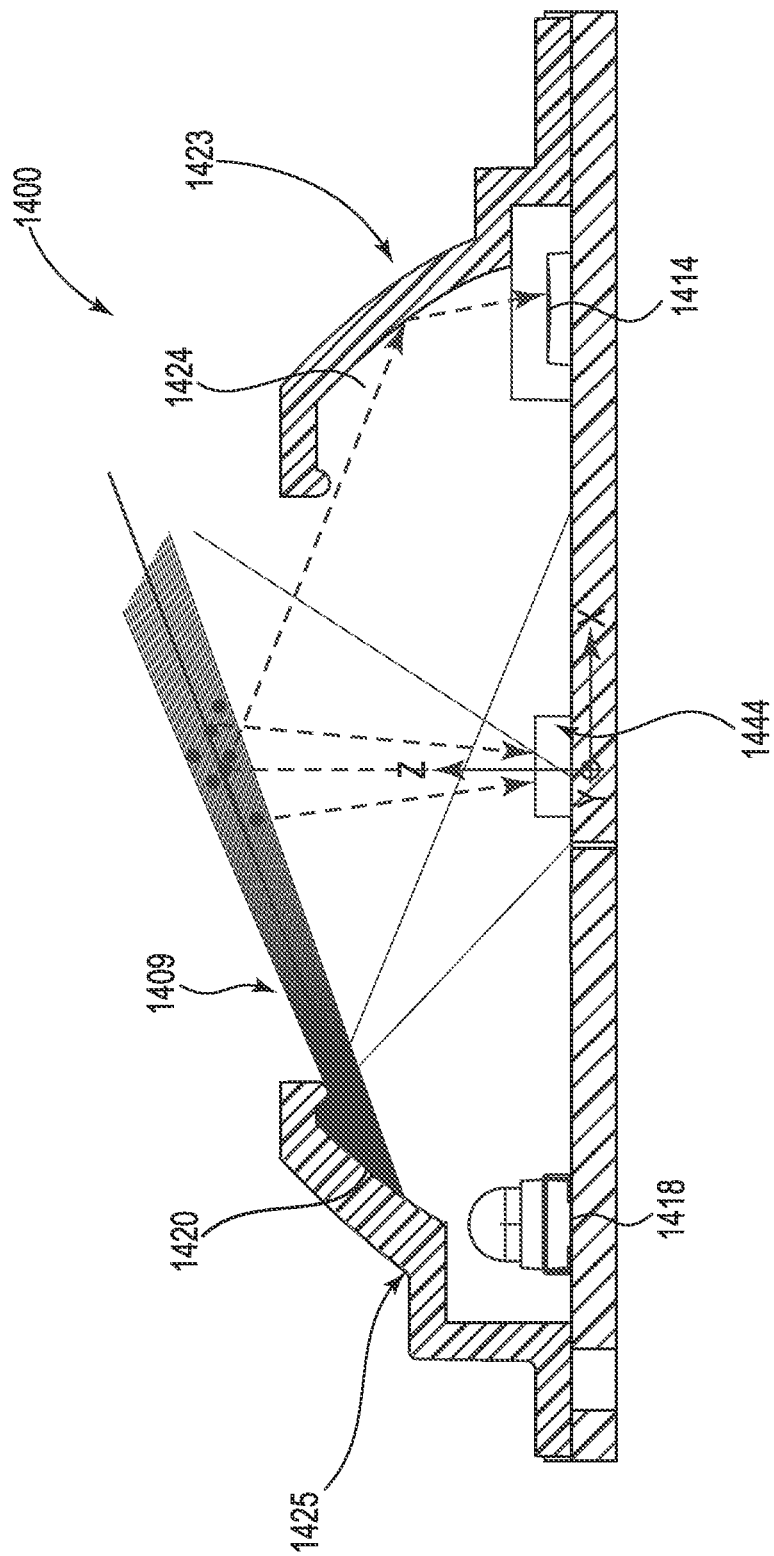
FIG. 14 is a cut-away view of the interior of a smoke detector having a backward scattering receiver in accordance with one or more embodiments of the present disclosure.

FIG. 14 is a cut-away view of the interior of a smoke detector having a backward scattering receiver in accordance with one or more embodiments of the present disclosure. In this embodiment, a backward scattering receiver 1444 (e.g., surface mounted type receiver) that can be positioned, for example, within a backward scattering cavity formed within a backward scattering module. The module can be similar to that shown in FIGS. 2 and 3 (e.g., 221 of FIG. 2 and 321 of FIG. 3). In this embodiment, the top of the backward scattering module can have a single aperture in the top surface as opposed to the multiple apertures shown in FIG. 3. In this way when the Infrared or the blue emitter illuminates the smoke in the optical chamber, the radiation is scattered by smoke particles (black dots in FIG. 14), the receiver 1444 (located in the back scattering cavity) receives scattered light from an angle of 70°±10 with respect to the main axes (x, y, z) of emitter radiation while the front scattering receiver 1414 receives scattered light from an angle of 140°±15 with respect the main axes of emitter radiation.

To implement a dual angle/dual wavelength configuration, two receivers and two emitters (e.g., one infrared 411 and one blue 413 emitter of FIG. 4, one receiver for forward optical scattering 1414 and one receiver for backward optical scattering 1444) configuration can be utilized. Such an embodiment is illustrated in FIG. 14, where a printed circuit board includes two emitters 1418 (e.g., 411 and 413 of FIG. 4), a backward scattering receiver 1444 and a forward scattering receiver 1414 provided thereon.

The electronic circuit pulses one emitter at a time and the radiation coming from this emitter, scattered by smoke, is collected by the two receivers 1414 and 1444 generating the related optical signals. During a cycle (e.g., of 2 seconds) the two emitters are pulsed in sequence (e.g., every second) generating at the two receivers four different optical signals (e.g., Infrared Forward Scattering (IR FS), Blue Forward Scattering (Blue FS), Infrared Backward Scattering (IR BS), and Blue Backward Scattering (Blue BS)).

In some embodiments, a backward scattering (BS) cavity module (521 in FIG. 5), can be positioned to separate the two emitters 1418 and the receiver 1414. This cavity can provide several functions, including avoiding direct illumination of the forward scattering receiver and hosting the backward scattering receiver. For these reasons, the backward scattering cavity can have barriers to restrict the propagation of the light beams produced from the emitters and one aperture in its top to restrict the field of view of the backward scattering receiver.

The backward scattering module can form a cavity therein that houses the backward scattering receiver 1444. Also, as noted above, the module can be structured to have barriers (e.g., two "V" shaped barriers) and one aperture from which the infrared and blue backward scattering radiation is collected by the backward scattering receiver 1444. These features can be used to control the direction from which backward scattering radiation is collected.

As discussed, through use of the embodiments of the present disclosure smoke detectors can be more reliable, easier to manufacture, and more cost effective to produce, with more uniformity between produced devices and less opportunity for human error and can be more accurate in detecting smoke particulate in air flow. Such features can be very beneficial in detecting fires and alerting emergency personnel and building occupants early in a fire event, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A smoke detector of a fire sensing system, comprising:
   a circuit board body, having:
      a set of front scattering emitting light sources located on one side of an optical chamber;
      a receiver of front scattering light beams from the front scattering emitting light sources; and
      a set of backward scattering emitting light sources located between the set of front scattering emitting light sources and the receiver, the backward scattering light beams emitted from the backward scattering emitting light sources
   a circuit board cover mounted over the set of front scattering emitting light sources, the set of backward scattering emitting light sources, and the receiver;
   a forward scattering emitter module, placed within the circuit board cover, having a reflective surface formed on an interior surface of the forward scattering emitter module and wherein the reflective surface is positioned above the set of front scattering emitting light sources and reflects the front scattering light beams toward an optical cavity formed between the circuit board body and the circuit board cover;
   a receiving module, placed within the circuit board cover, having a reflective surface formed on an interior surface of the receiving module and wherein the reflective surface is positioned above the receiver and reflects the front scattering light beams toward the receiver; and
   a fixture within the circuit board cover shaped to precisely fit the shapes of the forward scattering emitter module and receiving module,
   wherein the reflective surface of the forward scattering emitter module includes a double tilted ellipsoidal mirror.

2. The smoke detector of claim 1, wherein the set of front scattering emitting light sources includes at least one infrared emitting light source.

3. The smoke detector of claim 1, the set of front scattering emitting light sources includes at least one blue emitting light source.

4. The smoke detector of claim 1, the set of backward scattering emitting light sources includes at least one infrared emitting light source.

5. The smoke detector of claim 1, the set of backward scattering emitting light sources includes at least one blue emitting light source.

6. The smoke detector of claim 1, wherein the circuit board cover is mounted over the set of front scattering emitting light sources, the set of backward scattering emitting light sources, and the backward scattering receiver and has the fixture into which the backward scattering receiver module is positioned.

7. The smoke detector of claim 6, wherein the circuit board cover includes a reflective surface positioned above the set of forward scattering emitters that reflect the forward scattering light beams toward an optical cavity formed between the circuit board body and the circuit board cover.

8. The smoke detector of claim 7, wherein the circuit board cover includes a reflective surface positioned above the receiver that reflect the forward scattering light beams and backward scattering light beams from an optical cavity formed between the circuit board body and the circuit board cover toward the receiver.

9. The smoke detector of claim 8, wherein the circuit board cover includes a backward scattering housing positioned above the set of backward scattering emitters that restrict the direction that the backward scattering light beams can travel after being emitted from the backward scattering emitters.

10. The smoke detector of claim 6, wherein the circuit board cover includes a reflective surface positioned above the receiver that reflect the forward scattering light beams and backward scattering light beams from an optical cavity formed between the circuit board body and the circuit board cover toward the receiver.

11. The smoke detector of claim 6, wherein the circuit board cover includes a backward scattering housing positioned above the set of backward scattering emitters that restricts the direction that the backward scattering light beams can travel after being emitted from the backward scattering emitters.

12. A smoke detector of a fire sensing system, comprising:
a detector housing body;
a circuit board body, having:
   a set of front scattering emitting light sources located on one side of an optical chamber;
   a receiver of front scattering light beams from the front scattering emitting light sources; and
   a set of backward scattering emitting light sources located between the set of front scattering emitting light sources and the receiver, the backward scattering light beams emitted from the backward scattering emitting light sources; and
   a circuit board cover mounted over the set of front scattering emitting light sources, the set of backward scattering emitting light sources, and the receiver;
a forward scattering emitter module, placed within the circuit board cover, having a reflective surface formed on an interior surface of the forward scattering emitter module and wherein the reflective surface is positioned above the set of front scattering emitting light sources and reflects the front scattering light beams toward an optical cavity formed between the circuit board body and the circuit board cover;
a receiving module, placed within the circuit board cover, having a reflective surface formed on an interior surface of the receiving module and wherein the reflective surface is positioned above the receiver and reflects the front scattering light beams toward the receiver and
a fixture within the circuit board cover shaped to precisely fit the shapes of the forward scattering emitter module and receiving module.

13. The smoke detector of claim 12, wherein the circuit board cover includes the forward scattering emitter module having a reflective surface formed on an interior surface of the forward scattering emitter module and wherein the reflective surface is positioned above the set of forward scattering emitters that reflect the forward scattering light beams toward an optical cavity formed between the circuit board body and the circuit board cover.

14. The smoke detector of claim 12, wherein the circuit board cover includes the receiving module having a reflective surface formed on an interior surface of the module and wherein the reflective surface is positioned above the receiver that reflect the forward scattering light beams toward the receiver.

15. The smoke detector of claim 12, wherein the circuit board cover includes a backward scattering emitter module having a housing positioned above the set of backward scattering emitters that restricts the direction that the backward scattering light beams can travel after being emitted from the backward scattering emitters.

* * * * *